US012810847B2

(12) United States Patent
Kim et al.

(10) Patent No.: US 12,810,847 B2
(45) Date of Patent: Nov. 24, 2026

(54) VOICE ASSISTANT SYSTEM USING INFORMATION FROM SPOKEN LANGUAGE UNDERSTANDING AND LARGE LANGUAGE MODEL

(71) Applicant: Samsung Electronics Co., Ltd., Suwon-si (KR)

(72) Inventors: Euisung Kim, Mountain View, CA (US); Yun Tang, Sunnyvale, CA (US); Taeyeon Ki, Milpitas, CA (US); Divya Neelagiri, Dublin, CA (US); Vijendra Raj Apsingekar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 18/952,906

(22) Filed: Nov. 19, 2024

(65) Prior Publication Data

US 2026/0038490 A1 Feb. 5, 2026

Related U.S. Application Data

(60) Provisional application No. 63/678,334, filed on Aug. 1, 2024.

(51) Int. Cl.

*G10L 15/00* (2013.01)
*G10L 15/14* (2006.01)
(Continued)

(52) U.S. Cl.

CPC .............. *G10L 15/18* (2013.01); *G10L 15/14* (2013.01); *G10L 15/22* (2013.01)

(58) Field of Classification Search

CPC ...... G06F 40/30; G06F 40/274; G06F 40/289; G06F 40/295; G06F 40/284;
(Continued)

(56) References Cited

U.S. PATENT DOCUMENTS

| | | | | |
|---|---|---|---|---|
| 10,304,444 | B2 | 5/2019 | Mathias et al. | |
| 11,942,080 | B2 * | 3/2024 | Mirrezaei | G06F 40/30 |

(Continued)

FOREIGN PATENT DOCUMENTS

| | | | |
|---|---|---|---|
| CN | 108962224 | B | 6/2020 |
| CN | 117349439 | A | 1/2024 |

OTHER PUBLICATIONS

Bhasin, Anmol, et al. "Parallel intent and slot prediction using mlb fusion." 2020 IEEE 14th international conference on semantic computing (ICSC). IEEE, 2020. (Year: 2020).*

(Continued)

*Primary Examiner* — Edgar X Guerra-Erazo

(57) ABSTRACT

A method includes receiving an input and generating a first automatic speech recognition (ASR) hypothesis based on the input using an ASR model. The method also includes generating domain information using a domain detector model using the ASR hypothesis. The method also includes generating spoken language understanding (SLU) embedded information based on the input using an SLU model and generating an SLU hypothesis using the SLU embedded information in a decoding algorithm. The method also includes generating a final intent and slot prediction using the SLU hypothesis in a large language model (LLM) model and sending the final intent and slot prediction to an electronic device.

20 Claims, 10 Drawing Sheets

(51) Int. Cl.
*G10L 15/18* (2013.01)
*G10L 15/22* (2006.01)

(58) Field of Classification Search
CPC ....... G06F 40/279; G10L 15/16; G10L 15/18; G10L 15/20; G10L 15/08; G10L 15/083; G10L 2015/085; G10L 15/1815; G10L 15/1822; G10L 15/183; G10L 15/22; G10L 2015/221; G10L 17/04; G10L 17/18; G10L 17/22; G10L 17/24; G10L 2015/225; G10L 2015/223; G10L 15/00
See application file for complete search history.

(56) References Cited

U.S. PATENT DOCUMENTS

| | | | | |
|---|---|---|---|---|
| 11,948,580 | B2 * | 4/2024 | Goel | G10L 15/18 |
| 2022/0246141 | A1 * | 8/2022 | Mirrezaei | G06F 40/30 |
| 2023/0062201 | A1 * | 3/2023 | Goel | G10L 15/22 |
| 2023/0245654 | A1 | 8/2023 | Shrivastava et al. | |
| 2023/0343323 | A1 | 10/2023 | Baeuml et al. | |

OTHER PUBLICATIONS

D.-T. Do, M.-P. Nguyen and L.-M. Nguyen, "ConSLU: Constrained Decoding for Enhanced Spoken Language Understanding in Joint End-to-End Models," 2024 16th International Conference on Knowledge and System Engineering (KSE), Kuala Lumpur, Malaysia, 2024, pp. 13-18. (Year: 2024).*
Hu, E., et al., "LoRA: Low-Rank Adaptation of Large Language Models", arXiv:2106.09685v2 [cs.CL], Oct. 16, 2021, 26 pages.

* cited by examiner

VOICE ASSISTANT SYSTEM USING INFORMATION FROM SPOKEN LANGUAGE UNDERSTANDING AND LARGE LANGUAGE MODEL

CROSS-REFERENCE TO RELATED APPLICATIONS AND CLAIM OF PRIORITY

The present application claims priority to U.S. Provisional Patent Application No. 63/678,334, filed on Aug. 1, 2024, the contents of which are incorporated herein by reference in their entirety.

TECHNICAL FIELD

This disclosure relates generally to machine learning systems and processes. More specifically, this disclosure relates to voice assistant systems using information from spoken language understanding and a large language model.

BACKGROUND

Voice assistant frameworks may rely on Automatic Speech Recognition (ASR) and Natural Language Understanding (NLU) components to understand and respond to user requests. These components work together to transcribe spoken input into text and then analyze the text to identify user intent and relevant entities. However, these frameworks present challenges. For example, ASR error may be propagated to NLU and embed further error. Additionally, accuracy of the ASR and NLU may be limited by complex intent classification and name entity recognition, limiting the function of the voice assistant framework.

Accordingly, there is a need for systems and methods for end-to-end spoken language understanding and automatic speech recognition that overcome these challenges.

SUMMARY

The present disclosure relates generally to machine learning systems and processes and, more specifically, to voice assistant systems using information from spoken language understanding and a large language model.

In one embodiment, a method includes receiving an input and generating a first automatic speech recognition (ASR) hypothesis based on the input using an ASR model. The method also includes generating domain information using the domain detector model using the ASR hypothesis, generating spoken language understanding (SLU) embedded information based on the input using an SLU model, generating an SLU hypothesis using the SLU embedded information in a decoding algorithm, generating a final intent and slot prediction using the SLU hypothesis in a large language model (LLM) model, and sending the final intent and slot prediction to an electronic device.

In another embodiment, an electronic device includes at least one processing device. The at least one processing device is configured to receive an input and generate a first automatic speech recognition (ASR) hypothesis based on the input using an ASR model. The at least one processing device is also configured to generate domain information using a domain detector model using the ASR hypothesis. The at least one processing device is also configured to generate spoken language understanding (SLU) embedded information based on the input using an SLU model. The at least one processing device is also configured to generate an SLU hypothesis using the SLU embedded information in a decoding algorithm. The at least one processing device is also configured to generate a final intent and slot prediction using the SLU hypothesis in a large language model (LLM) model. The at least one processing device is also configured to send the final intent and slot prediction to another electronic device.

In yet another embodiment, a non-transitory computer-readable medium includes instructions that, when executed by at least one processor of an electronic device, cause the electronic device to receive an input and generate a first automatic speech recognition (ASR) hypothesis based on the input using an ASR model. The non-transitory machine readable medium also includes instructions that, when executed by the at least one processor of the electronic device, cause the electronic device to generate domain information using a domain detector model using the ASR hypothesis. The non-transitory machine readable medium also includes instructions that, when executed by the at least one processor of the electronic device, cause the electronic device to generate spoken language understanding (SLU) embedded information based on the input using an SLU model. The non-transitory machine readable medium also includes instructions that, when executed by the at least one processor of the electronic device, cause the electronic device to generate an SLU hypothesis using the SLU embedded information in a decoding algorithm. The non-transitory machine readable medium also includes instructions that, when executed by the at least one processor of the electronic device, cause the electronic device to generate a final intent and slot prediction using the SLU hypothesis in a large language model (LLM) model. The non-transitory machine readable medium also includes instructions that, when executed by the at least one processor of the electronic device, cause the electronic device to send the final intent and slot prediction to another electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

As introduced above, voice assistant systems may use an automated speech recognition (ASR) engine and a native language understanding (NLU) engine, which includes intent classification (IC) and named entity recognition (NER). However, these frameworks have limitations, particularly with accuracy in classifying intents and recognizing named entities, particularly in complex and dynamic scenarios. For example, IoT-related intent classification suffers due to the complexity and variety of intents and slots. Further, ASR errors propagate to NLU modeling and affect prediction of IC and NER. Although ASR models aim to transcribe speech to text accurately, real-world conditions introduce significant errors, e.g., noisy environments, diverse accents, acoustic variations, and speaker differences. Additionally, voice assistant systems may, on a 1-best ASR hypothesis, create an information bottleneck, limiting the performance of NLU tasks, including IC and NER.

Accordingly, the present disclosure provides systems and methods for joint end-to-end spoken language understanding and automatic speech recognition. As described herein, the present disclosure includes a voice assistant framework with a spoken language understanding (SLU) model that improve the ASR hypotheses by generating an N-best lattice and subsequently generating an N-best list of SLU hypotheses. These SLU hypotheses are used to generate predictions of intents and slots using an LLM model. The use of the SLU model and the LLM model improves the accuracy of the intent and slot predictions while alleviating information bottlenecks.

Figure 1:
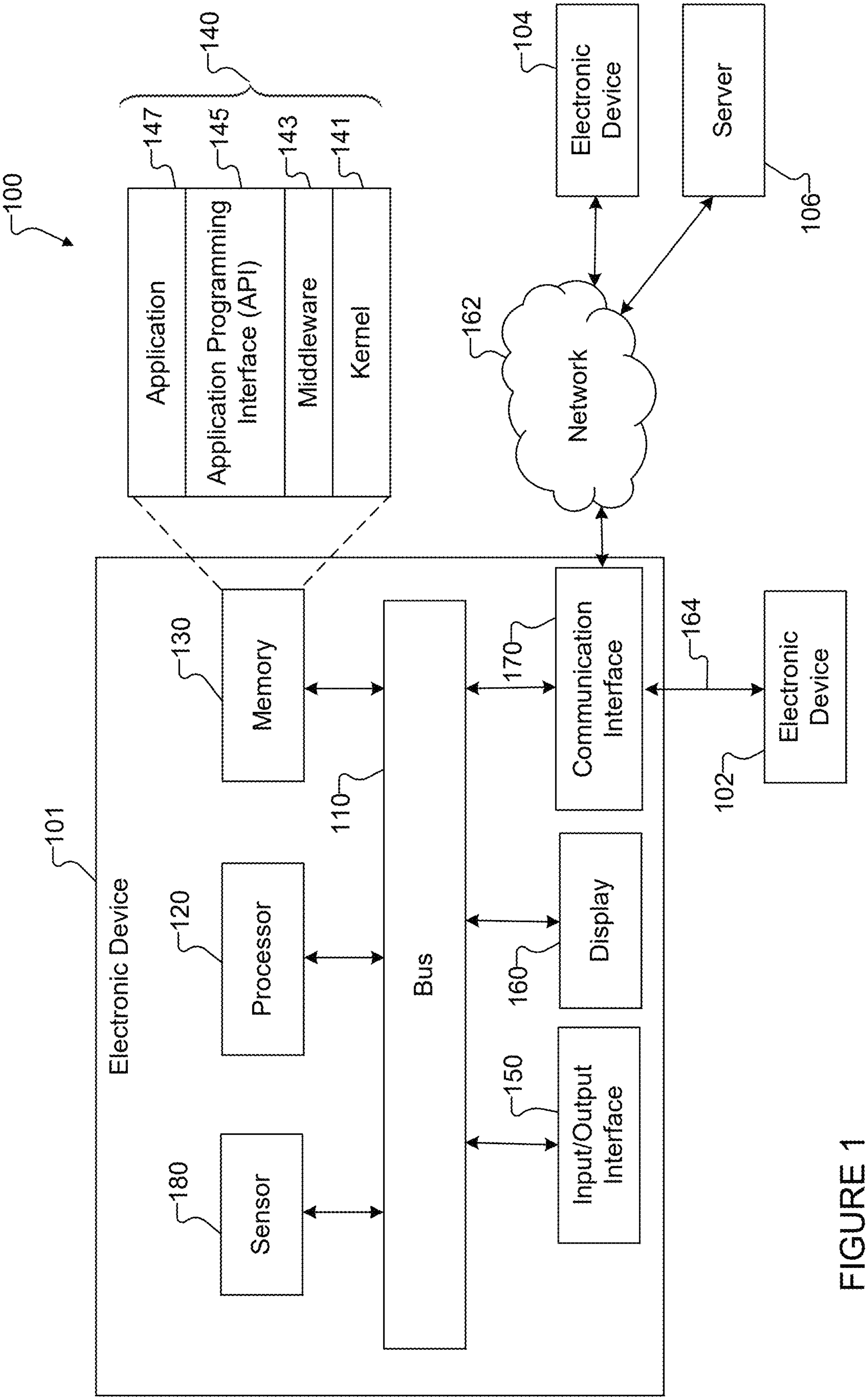
FIG. 1 illustrates an example network configuration 100 including an electronic device according to an embodiment of the present disclosure.

FIG. 1 illustrates an example network configuration 100 including an electronic device according to an embodiment of the present disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to voice assistant systems using information from spoken language understanding and a large language model.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to voice assistant systems using information from spoken language understanding and a large language model. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to voice assistant systems using information from spoken language understanding and a large language model.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
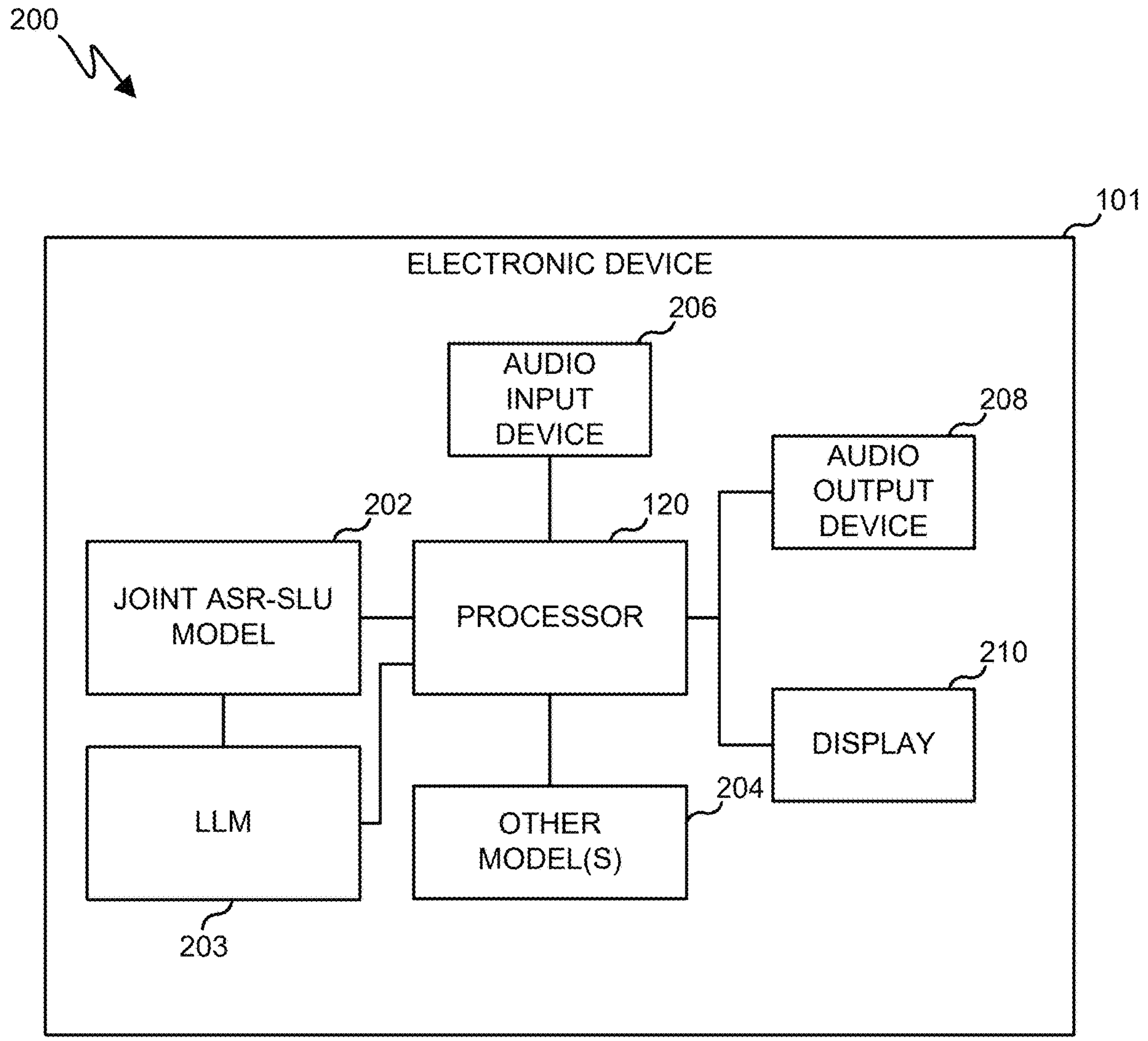
FIG. 2 illustrates an example voice assistant system according to an embodiment of the present disclosure.

FIG. 2 illustrates an example voice assistant system 200 according to an embodiment of the present disclosure. For case of explanation, the system 200 is described as involving the use of the electronic device 101 in the network configuration 100 of FIG. 1. However, the system 200 may be used with any other suitable device (such as the server 106) or a combination of devices (such as the electronic device 101 and the server 106) and in any other suitable system(s).

As shown in FIG. 2, the system 200 includes the electronic device 101, which includes the processor 120. The processor 120 is operatively coupled to or otherwise configured to use one or more machine learning models, such as a joint ASR-SLU model 202. As further described in this disclosure, the joint ASR-SLU model 202 can include various components and sub-models, such as a speech encoder, a shared encoder, and a shared decoder. The joint ASR-SLU model 202 can be trained by training the shared encoder and the shared decoder using a text-to-text task, and, after training the shared encoder and the shared decoder, training the speech encoder and the shared encoder using a speech self-supervised learning (SSL) learning task and a text-to-text task with a masked prediction loss, where the speech and text modalities are connected through supervised learning with phoneme-unit sequence classification criterion and supervised sequential loss with subword tokens. The trained joint ASR-SLU model 202 can receive an utterance as an input, and the joint model 202 can operate in (1) a single mode to perform both ASR and SLU, or (2) a dual mode to perform ASR depending on the context or application. The joint model 202 can generate an output used to perform an action by the electronic device 101 requested in the utterance.

The processor 120 can also be operatively coupled to or otherwise configured to use a large language model (LLM) 203. As described in this disclosure, the LLM 203 can be used to refine predicted ASR hypotheses, intents, and named entities provided by the joint ASR-SLU model 202, and enhancing the overall accuracy of predictions. The processor 120 can also be operatively coupled to or otherwise configured to use one or more other machine learning models 204, such as other models related to automated speech recognition or voice assistant processes. It will be understood that the machine learning models 202, 204 can be stored in a memory of the electronic device 101 (such as the memory 130) and accessed by the processor 120 to perform automated speech recognition tasks, spoken language understanding tasks, and/or other tasks. However, the machine learning models 202, 204 can be stored in any other suitable manner.

The system 200 also includes an audio input device 206 (such as a microphone), an audio output device 208 (such as a speaker or headphones), and a display 210 (such as a screen or a monitor like the display 160). The processor 120 receives an audio input from the audio input device 206 and provides the audio input to the trained joint ASR-SLU model 202. The trained joint ASR-SLU model 202 processes the audio input and outputs a result to the processor 120, such as one or more slot-filled data structures and/or intents associated with the audio input. The processor 120 may instruct one or more further actions that correspond to one or more instructions or requests provided in the utterance.

As a particular example, assume an utterance is received from a user via the audio input device 206 including a command (such as "call mom"). Here, the trained joint ASR-SLU model 202 is used to recognize the command to be performed using either the single mode or the dual mode. Based on the output of the joint ASR-SLU model 202, the processor 120 instructs the audio output device 208 to output "calling Mom." The processor 120 also causes a phone application or other communication application to begin a communication session with a "mom" contact stored on the electronic device 101 or otherwise in association with the user of the electronic device 101. As another example, suppose an utterance of "start a timer" is received. The trained joint ASR-SLU model 202 may process the utterance and provide an output that the processor 120 uses to instruct execution of a timer application and display of a timer on the display 210 of the electronic device 101.

Although FIG. 2 illustrates one example of a voice assistant system 200, various changes may be made to FIG. 2. For example, in some embodiments, the audio input device 206, the audio output device 208, and the display 210 can be connected to the processor 120 within the electronic device 101, such as via wired connections or circuitry. In other embodiments, the audio input device 206, the audio output device 208, and the display 210 can be external to the electronic device 101 and connected via wired or wireless connections. Also, in some cases, the joint ASR-SLU model 202 and one or more of the other machine learning models 204 can be stored as separate models called upon by the processor 120 to perform certain tasks or can be included in and form a part of one or more larger machine learning models. Further, in some embodiments, one or more of the machine learning models, such as the joint ASR-SLU model 202 and/or one or more of the other machine learning models 204, can be stored remotely from the electronic device 101, such as on the server 106. Here, the electronic device 101 can transmit requests including inputs (such as captured audio data) to the server 106 for processing of the inputs using the machine learning models, and the results can be sent back to the electronic device 101. In addition, in some embodiments, the electronic device 101 can be replaced by the server 106, which receives audio inputs from a client device and transmits instructions back to the client device to execute functions associated with instructions included in utterances.

Figure 3A:
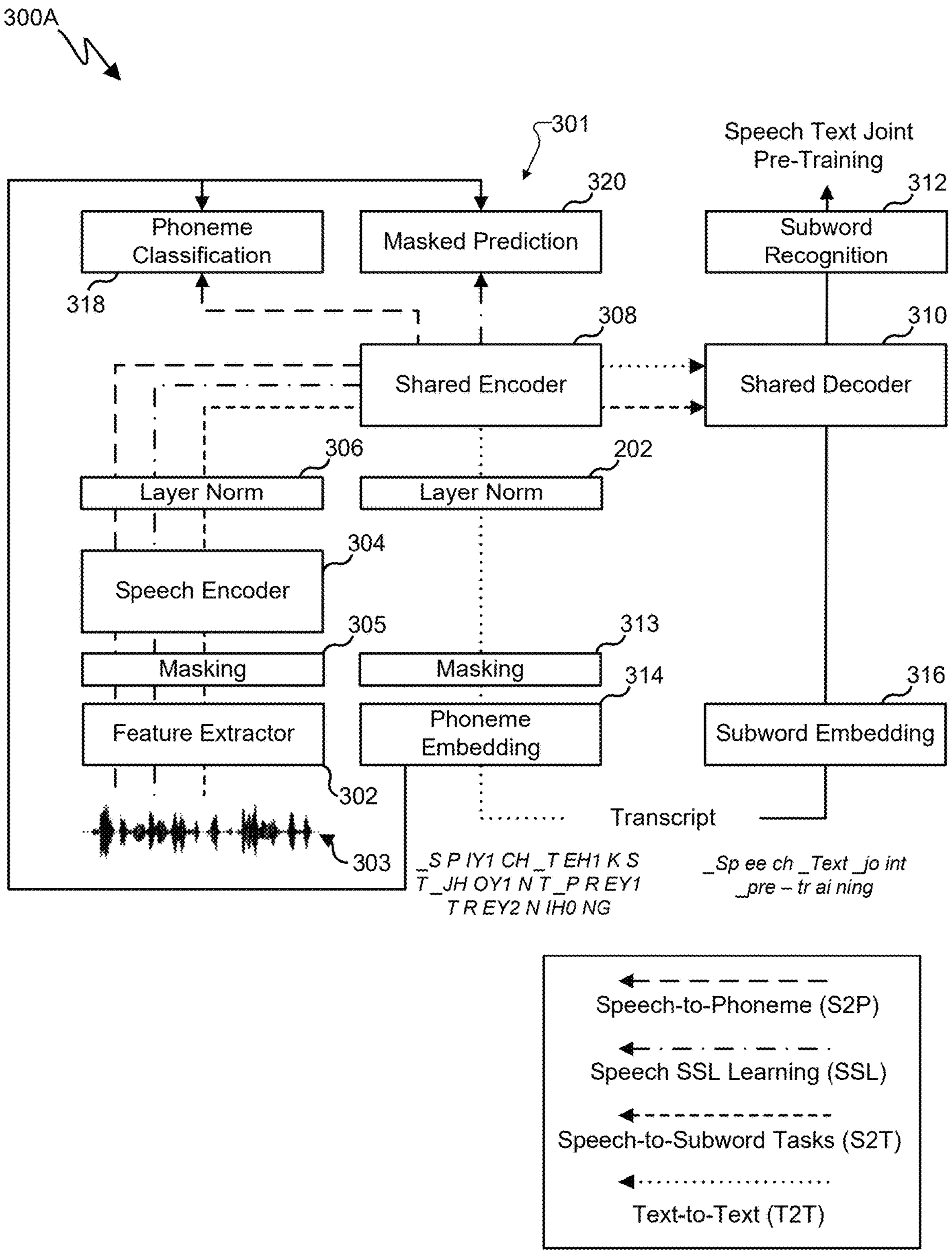
FIG. 3A illustrates an example joint pre-training process according to an embodiment of the present disclosure.

FIG. 3A illustrates an example joint pre-training process 300A according to an embodiment of the present disclosure. For case of explanation, the process 300A is described as involving the use of the electronic device 101 in the network configuration 100 of FIG. 1. However, the process 300A may be used with any other suitable electronic device (such as the server 106) or a combination of devices (such as the electronic device 101 and the server 106) and in any other suitable system(s).

As shown in FIG. 3A, the process 300A includes training a joint ASR-SLU model 301, such as the joint ASR-SLU model 202 described with respect to FIG. 2. In various embodiments, the joint model 301 can be based on an attention-based encoder-decoder (AED) model. The joint model 301 includes a feature extractor 302, a speech encoder 304, a layer normalization operation 306, a shared encoder 308, and a shared decoder 310. As shown in FIG. 3A, training the joint model 301 involves a joint speech-to-text pre-training (STPT) phase. The STPT phase integrates self-supervised and supervised pre-training tasks, including text-to-text (T2T), speech self-supervised learning (SSL), speech-to-phoneme (S2P), and speech-to-subword/speech-to-text tasks (S2T) to learn acoustic and linguistic representations. The STPT phase can include training the joint model 301 using a two-step process.

As shown in FIG. 3A, the overall operation of the joint model 301 includes using the feature extractor 302 to extract features from an audio input 303. These features can be processed by a masking operation 305 for use by the speech encoder 304. The spoken signal is input to the speech encoder 304, which encodes the speech signals for use by the shared encoder 308, followed by the layer normalization operation 306 and the shared encoder 308. In some embodiments, the shared encoder 308 can be a transformer and a conformer, which is a combination of a convolutional neural network (CNN) and a multi-head self-attention-based transformer. The shared encoder 308 is used to provide acoustic representations of audio input data. In some embodiments, a filter-bank feature can be used from the feature extractor 302, such that the shared encoder 308 maps an input filter bank feature sequence to the acoustic representation.

The shared decoder 310 can be an attention-based decoder, and can receive one or more of any previous tokens generated by the model. For example, the shared decoder 310, using outputs from the shared encoder 308, generates subword outputs with previously generated tokens from the shared decoder 310 auto-regressively. The subword outputs are used by a subword recognition operation 312. The subword recognition operation 312, in the training phase, can be a softmax function to calculate a probability distribution from the output of the shared decoder. The subword recognition operation 312, in the inference phase, can be greedy search decoding or beam search decoding function. For example, greedy search decoding can include calculating a probability distribution using a softmax function and then selecting the subword token with the maximum probability at each step.

As noted above, the process 300A can include a two-step training process. In a first step, the shared encoder 308 and the shared decoder 310 are trained using a text-to-text self-supervised loss ($L_{T2T}$) loss so that, initially, the shared encoder and decoder learn the linguistic aspects of the text through the T2T self-supervised loss. The T2T self-supervised loss is computed using a cross entropy loss, with the target text sequence and its corresponding masked phoneme sequence as inputs. In this step, the phoneme embedding operation 314 generates phoneme embeddings from the text sequence, while masking operation 313 produces a corrupted version of the text sequence. This is illustrated in FIG. 3A as a dotted line. As shown in FIG. 3A, the shared encoder 308 outputs the acoustic representations to both the shared decoder 310, and to a phoneme embedding operation 314, through another masking operation 313. The phoneme embedding operation 314 provides subword embeddings 316, which are provided to the shared decoder 310 and used by the shared decoder 310 in generating the subword outputs.

In a second training step, the model is trained on all four tasks: text-to-text (T2T), speech self-supervised learning (SSL) (shown as a dot-dash line in FIG. 3A), speech-to-phoneme (S2P) (shown as a long-dash line in FIG. 3A from the shared encoder 308 to a phoneme classification model 318), and speech-to-subword tasks (S2T) (shown as a short-dash line in FIG. 3A). Specifically, the speech encoder 304 and the shared encoder 308 are updated during this second step to acquire sufficient acoustic and linguistic representations while training the model through SSL and T2T with masked prediction loss ($L_{SSL}$). The masked prediction loss ($L_{SSL}$) is computed by minimizing the Kullback-Leibler divergence between masked speech feature spans, produced by the feature extractor 302, and the corresponding context encoder output from the Speech Encoder 304. Two modalities are connected through supervised learning with phoneme-unit sequence classification criterion ($L_{S2P}$) and supervised sequential loss ($L_{S2T}$) with subword tokens. The speech-to-phoneme loss ($L_{S2P}$) is optimized with the cross entropy loss with the shared encoder 308 output and the corresponding ground truth phoneme labels provided by phoneme embedding operation 314. Speech-to-subword loss ($L_{S2T}$) is calculated using cross entropy criterion with output of shared decoder 310 and sub-word token sequence units. The final joint pre-training loss used during training can be expressed as follows.

$$L_{TOT} = L_{T2T} + L_{SSL} + L_{S2P} + L_{S2T}$$

When the joint pre-training loss calculated by the loss function is larger than desired, the parameters of the joint model 301 can be adjusted. Once adjusted, the same or additional training data can be provided to the joint model 301, and additional outputs from the joint model 301 model, including the masked prediction 320, can be compared to ground truths so that additional losses can be determined using the loss function. Ideally, over time, the joint model 301 produces more accurate outputs that more closely match the ground truths, and the measured loss becomes less. At some point, the measured loss can drop below a specified threshold, and the pre-training of the joint model 301 can be completed.

Although FIG. 3A illustrates one example of a spoken language understanding model training process 300A, various changes may be made to FIG. 3A. For example, various components and functions in FIG. 3A may be combined, further subdivided, replicated, or rearranged according to particular needs. Also, one or more additional components and functions may be included if needed or desired.

Figure 3B:
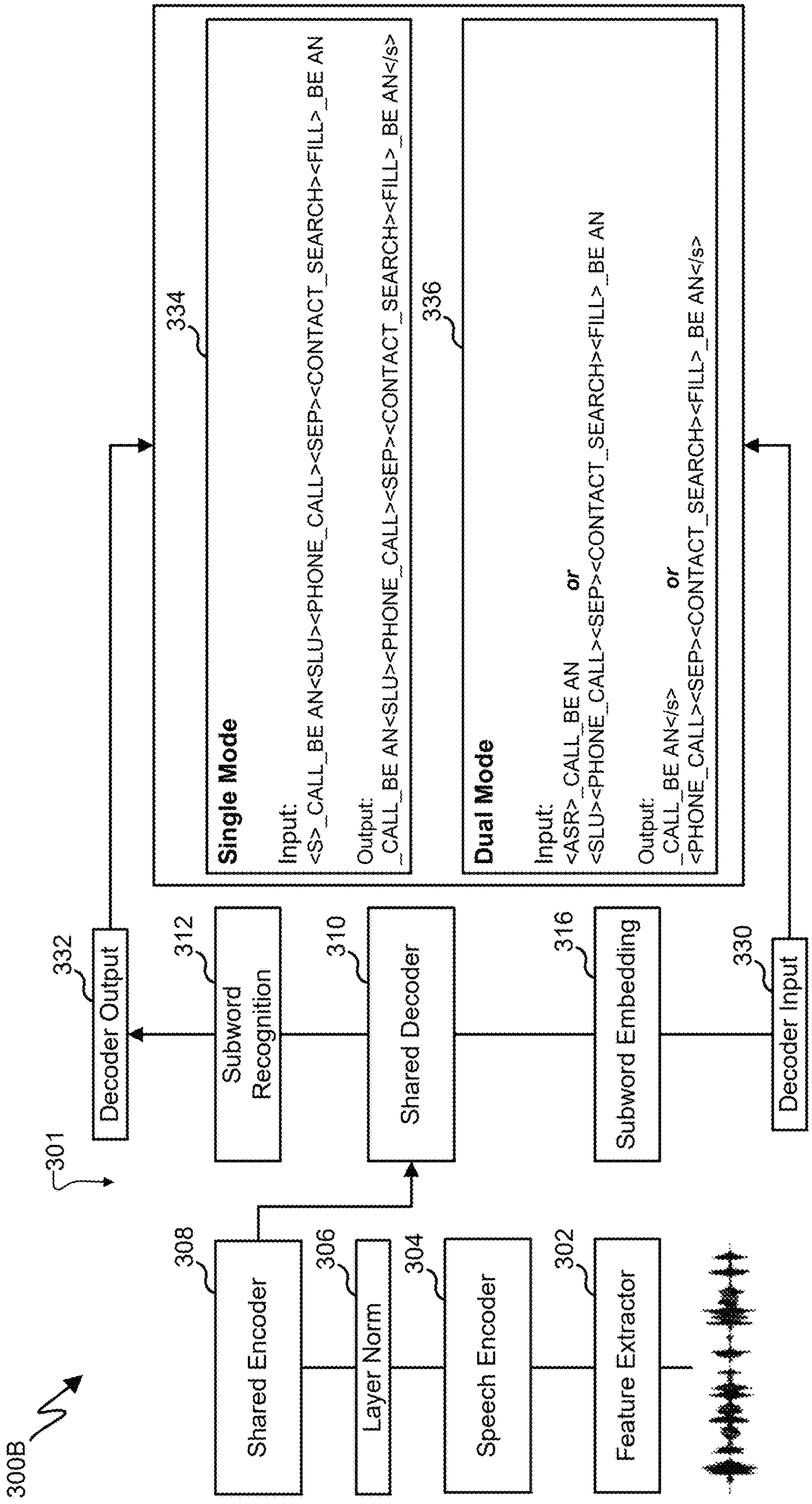
FIG. 3B illustrates an example joint ASR-SLU model process in according to an embodiment of the present disclosure.

FIG. 3B illustrates an example joint ASR-SLU model process 300B according to an embodiment of the present disclosure. For ease of explanation, the process 300B is described as involving the use of the electronic device 101 in the network configuration 100 of FIG. 1. However, the process 300B may be used with any other suitable electronic device (such as the server 106) or a combination of devices (such as the electronic device 101 and the server 106) and in any other suitable system(s).

After the joint model is pre-trained, the joint model is finetuned via E2E SLU and ASR joint optimization to provide a finetuned joint model 301. The model 301 estimates sequence posterior probabilities for sub-word outputs (transcript, intent, and slots). The joint model 301 is configured via the finetuning to operate (1) in a single mode and (2) in a dual mode. For example, in some embodiments, the finetuned joint model 301 can be a single mode joint model that retains the simplicity of the model for both of SLU and ASR as well as simultaneously making learning easier by introducing an intermediate transcript representation corresponding to the input audio. In some embodiments, the finetuned joint model 301 can be a dual mode joint model that allows the model to be run by switching ASR or SLU tasks with one well-trained model.

In some embodiments, a single joint model for single and dual modes can be created via finetuning from the pre-training joint model. In such embodiments, a model can be stored for use and used as needed based on the context. For example, the model for single mode may be associated with certain device applications while the model for dual mode is associated with other device applications. For instance, if a smart speaker without a display screen receives an utterance to play a song, the smart speaker can use the model for dual mode in the SLU mode, since ASR may not be needed as there is no output to display on a screen. Conversely, an electronic device with a display screen that runs a voice assistant conversation application may use the model for single mode because the voice assistant conversation application can use both SLU to determine tasks to be performed, and can use ASR to show an ASR output on the display screen. As another example, a map/navigation application may use both ASR to display an ASR output pertaining to the navigation request, and use SLU to initiate and perform a navigation task. In some embodiments, the device may only store and/or execute one of the model for single mode or the model for dual mode, such as if the device only uses the model for single mode based on the device only running applications that use both ASR and SLU, or vice versa the device may only store and/or execute the model for dual mode if the device only runs applications that use one of ASR or SLU, and not both.

In some embodiments, for efficiency and to save storage space, the finetuned joint model 301 can be a single model configured to switch between the single mode and the dual mode based on the context. For example, the model could switch to the single mode when an application uses both ASR and SLU, or to the dual mode when the application uses one of ASR or SLU. It will be understood that a same application may also require use of ASR, SLU, or both depending on the application or predefined particular function or device task to be carried out.

As shown in FIG. 3B, the joint model 301 is a backbone model that includes the feature extractor 302, the speech encoder 304, the layer normalization operation 306, the shared encoder 308, and the shared decoder 310 that are also illustrated in FIG. 3B. It will be understood that the joint model 301 may include the other components and/or operations shown in FIG. 3B as well. As shown in FIG. 3B, the decoder input 330 and the decoder output 332 differ depending on which of the single mode 334 or dual mode 336 is used.

Regarding the single mode 334, the single mode 334 is used to sequentially generate ASR and SLU results. The ASR and SLU results can be generated with separator tags, such as <SLU>, <FILL>, and <SEP>. The single mode 334 makes learning easier by introducing an intermediate transcript representation corresponding to the input audio and retains the model's simplicity for both SLU and ASR tasks. During finetuning, sequence-to-sequence (seq2seq) training is used with pairs of the ASR transcript and semantic (intent and slots) sequence and corresponding to a single speech signal as labels. During inferencing, the shared decoder generates sub-word outputs from the output of the shared encoder 308 with previously generated tokens from the shared decoder 310 in an auto-regressive manner.

Serializing transcript and semantics may be performed by concatenating them with the separator tags <SLU>, <FILL>, <SEP>. For instance, as shown in FIG. 3B, a tokenized transcript is provided as at least part of the decoder input 330 (e.g., an input including "<S>_CALL_BE_AN<SLU><PHONE_CALL><SEP> <CONTACT_SEARCH><FILL>_BE AN"). The tokenized transcript is concatenated to serialized intent and slot keys and values to provide the decoder output 332, which includes the ASR output followed sequentially by the SLU output (e.g., an output including "_CALL_BE AN<SLU><PHONE_CALL><SEP><CONTACT_ SEARCH><FILL>_BEAN</s>"). As shown in FIG. 3B, the <SLU> special tag separator is used as the start of semantics. Also, the serialized semantics are modeled such that the intent argument name is followed by entity argument name keys and its corresponding tokenized values, separated by separator tokens <SEP> and <FILL>. This approach provides a straightforward way to extract each semantics and enable the model 301 to learn semantic understanding.

Regarding the dual mode 336, the dual mode 336 allows the device to seamlessly switch between ASR and SLU tasks based on specific requirements, such as application requirements. The dual mode 336 helps the model achieve a richer representation by encouraging it to match outputs with two distinct but similar underlying information for the same acoustic context representation. During finetuning, an ASR transcript and semantic (intent and slots) sequence is prepared corresponding to a single speech signal as labels, respectively. Instead of utilizing the required <BOS> symbol for seq2seq training, a special tag indicating <ASR> or <SLU> is prepended at the beginning of each label.

During inferencing, the model can selectively use ASR or SLU by providing indicator tokens as part of the decoder input 330 to the shared decoder 310. For example, as shown in FIG. 3B, an <ASR> token can be provided in the input to indicate the model 301 should use ASR (e.g., "<ASR>_CALL_BE AN"), or an <SLU> token can be provided in the input to indicate the model 301 should use SLU (e.g., "<SLU><PHONE_CALL><SEP><CONTACT_SEARCH> <FILL>_BE AN"). The decoder output 332 of the model 301 when using ASR in the dual mode 336 corresponds to the ASR output (e.g., "_CALL_BE AN</s>"). The decoder output 332 of the model 301 when using SLU in the dual mode 336 corresponds to the SLU task (e.g., "<PHONE_CALL><SEP><CONTACT_SEARCH> <FILL>_BE AN</s>").

The joint model can be built to operate a single model in either single or dual mode. During finetuning, an ASR transcript, semantic (intent and slots) sequence, and pair of the ASR transcript and semantic (intent and slots) sequence is prepared corresponding to a single speech signal as labels, respectively. Instead of utilizing the required <BOS> symbol for seq2seq training, a special tag indicating <DUALASR>, <DUALSLU>, and <SINGLE> is prepended at the beginning of each label. During inferencing, the model can selectively use DUALASR or DUALSLU or SINGLE by providing indicator tokens as part of the decoder input 330 to the shared decoder 310.

Although FIG. 3B illustrates one example of a joint ASR-SLU model process 300B, various changes may be made to FIG. 3B. For example, various components and functions in FIG. 3B may be combined, further subdivided, replicated, or rearranged according to particular needs. Also, one or more additional components and functions may be included if needed or desired. For instance, in some embodiments, during inferencing using either the single mode or the dual, beam search decoding can be used to determine the final output. Additionally, while shown as a series of steps, various steps in FIG. 3B could overlap, occur in parallel, occur in a different order, or occur any number of times (including zero times).

Figure 4:
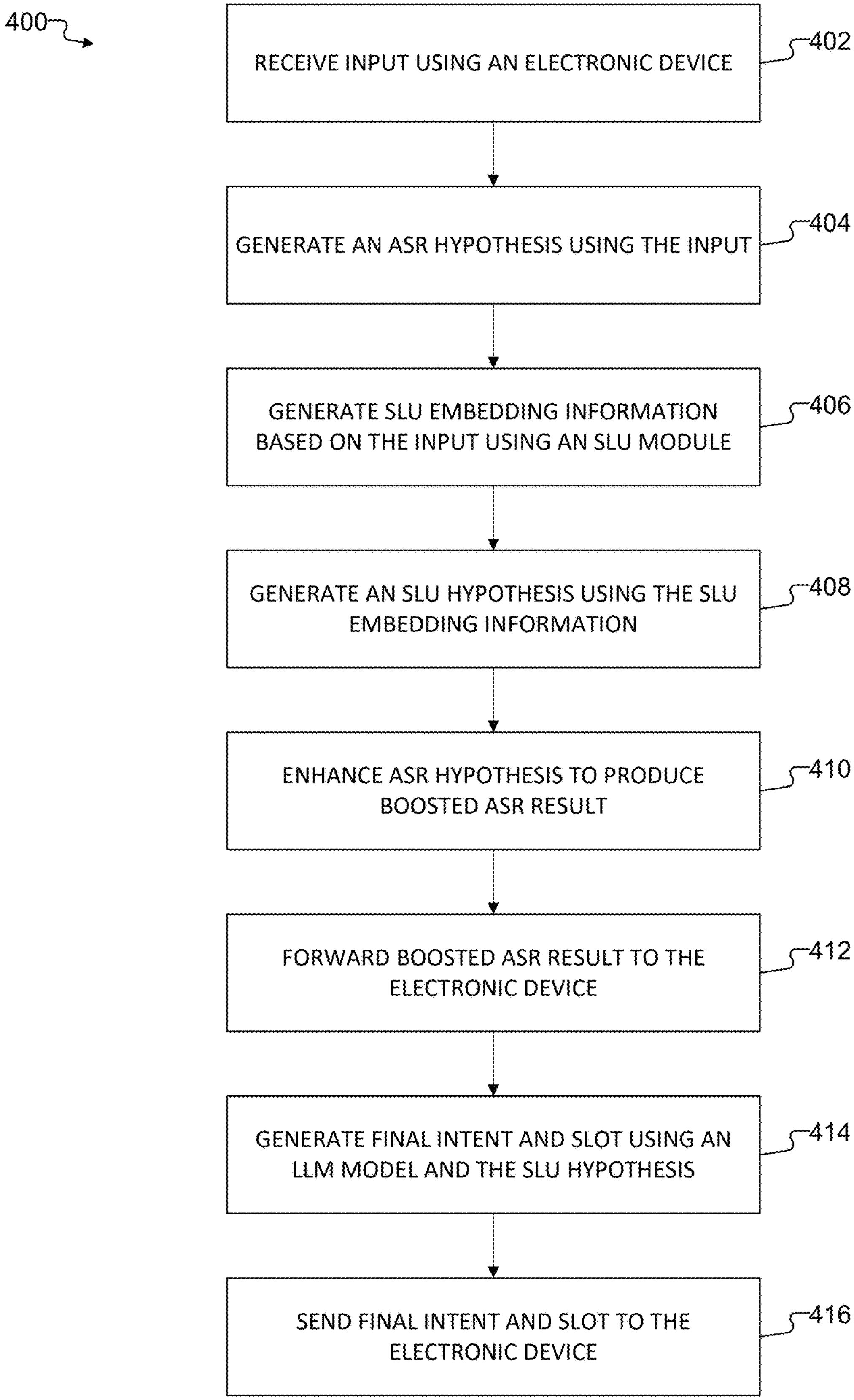
FIG. 4 illustrates an example method for automatic speech recognition and boosted spoken language understanding incorporating large language model according to an embodiment of the present disclosure.
Figure 5:
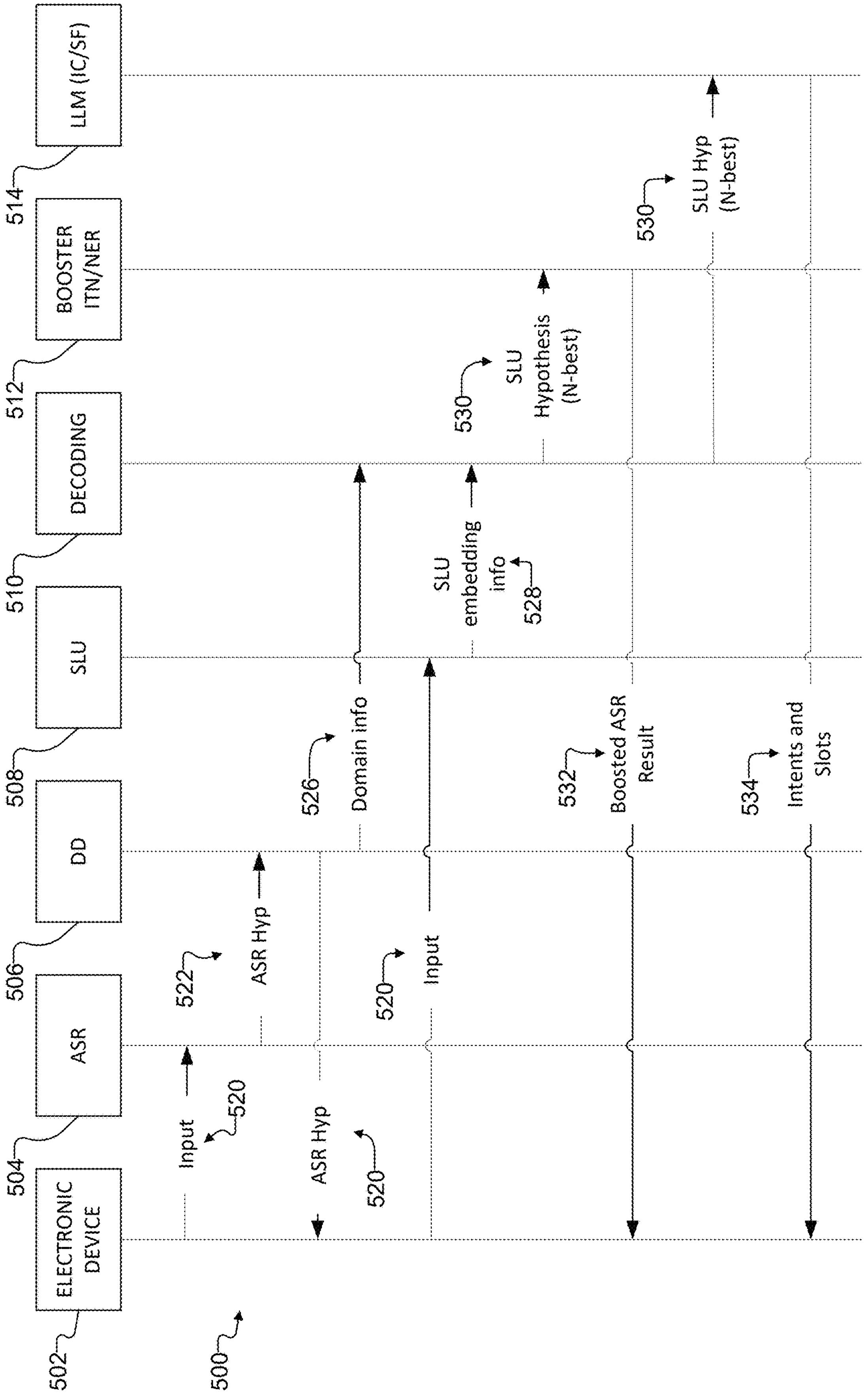
FIG. 5 illustrates an example diagram of an electronic device performing the method of FIG. 4 according to an embodiment of the present disclosure.

FIG. 4 illustrates an example method 400 for automatic speech recognition and boosted spoken language understanding incorporating large language model according to an embodiment of the present disclosure. For ease of explanation, the method 400 is described as involving the use of the electronic device 101 in the network configuration 100 of FIG. 1. However, the method 400 may be used with any other suitable electronic device (such as the server 106) or a combination of devices (such as the electronic device 101 and the server 106) and in any other suitable system(s). FIG. 5 illustrates an example diagram 500 of an electronic device performing the method 400 according to an embodiment of the present disclosure. For example, the electronic device may be the electronic device 101 in the network configuration 100 of FIG. 1. However, the diagram 500 may be used with any other suitable electronic device (such as the server 106) or a combination of devices (such as the electronic device 101 and the server 106) and in any other suitable system(s).

As shown in FIG. 4, the method 400 incorporates a large language model (LLM) 514, which can be the LLM 203, to predict a final intent and slots information 534 more accurately based on N-best Hypothesis of ASR transcriptions, intents, and name entity (Slot) from the SLU model 508, which can be part of the joint ASR-SLU model 202.

In operation 402, an input 520, e.g., audio provided by the user, is received, e.g., at an electronic device 502, and the input 520 is forwarded to an ASR model 504, which can be compact streaming ASR, separate from joint ASR-SLU model 202.

In operation 404, an ASR hypothesis 522 is generated by the ASR model 504. The ASR hypothesis 522 may be returned to the electronic device 502 for display to the user. The ASR hypothesis 522 may also be sent to a domain detector model 506 configured to detect a domain (Music/General/Contact/Others) using a from the ASR hypothesis 522.

In operation 406, the input 520 may be set to an SLU model 508 to generate SLU embedding information 528 using accumulated input 520. For example, the SLU model 508 may be configured similarly to the SLU model process 300B of FIG. 3B to produce a probability distribution for intent and slot predictions based on the received input 520.

In operation 408, the SLU embedding information 528, e.g., as probability distributions, are inputted into a decoding algorithm 510. The decoding algorithm may include a Language Model (LM) fusion that may also incorporate the domain information 526 as an input. The decoding algorithm 510 then generates an SLU hypothesis 530, e.g., using a beam-search decoding. The SLU hypothesis 530 may include an N-best list of SLU hypotheses. The N-best list of SLU hypotheses is generated by creating a lattice of potential intent and slot hypotheses using SLU embedding 528 from the SLU model 508. The least path in the lattice is the 1-best hypothesis, where the full lattice contains more paths. For example, the N-best list of SLU hypotheses can be obtained by selecting the n-least cost paths in the lattice.

An N-best list of SLU hypotheses provides multiple, potentially ranked, possible hypotheses compared to that of a 1-best hypothesis which allows the voice assistant system flexibility to select the most accurate hypothesis, e.g., intent hypothesis or slot hypothesis, and minimizes error.

In optional operation 410, the ASR hypothesis 522 may be enhanced by an ASR boosting model 512, e.g., a model that includes an inverse text normalization model and a named entity recognition model, to produce a boosted ASR result 532. The inverse text normalization model of the ASR boosting model 512 may convert a raw spoken output of the SLU hypothesis 530 into a readable written form while the name entity replace model may correct named entities that may be transcribed in the SLU hypothesis 530 to produce a boosted ASR result 532.

In operation 412, the ASR boosting model 512 may then send the boosted ASR result 532 to the electronic device 502 to use this result for specific purposes, such as displaying the boosted ASR result 532 or using the boosted ASR result 532 in other applications different from ASR-based systems.

In operation 414, an N-best based LLM model 514 may be used to process the SLU hypothesis 530, which may also be an N-best list of SLU hypotheses, to improve the accuracy of predicted intents and slots. For example, the LLM model 514 may be configured to model for intent classification model and slot filling. The goal of this task is to identify whether a spoken utterance, e.g., the input 520, is directed towards the electronic device 502 or not, e.g., directed to a human. The LLM model 514 takes probable N-best hypothesis which consist of ASR hypothesis, intent, and slots per each hypothesis from SLU decoding algorithm to improve the accuracy of the predicted final intent and slots information 534. The LLM model 514 may be trained using a low rank adaptation (LoRA) process, e.g., a parameter-efficient fine-tuning process, to output a final prediction of an intent and a slot from the plurality of intent and slot hypotheses. For example, during the LoRA training, the LLM model in the LLM model 514 may add a small number of new weights to the LLM model rather than update the entirety of the model. The new weights may be rank-decomposed matrices inserted into each layer of the LLM model. The LoRA training then proceeds by only training the new weights. For example, the LoRA training for the LLM model 514 may include training weights regarding an N-best list of SLU hypotheses and an intent or slot to improve a final prediction of intent and a slot from a plurality of intent and slot hypotheses, e.g., from an N-best list of SLU hypotheses.

In operation 416, the final intent and slot from the LLM model 514 is sent to the electronic device 502 for display or use in other systems.

Although FIG. 4 illustrates one example of a method 400 for automatic speech recognition and boosted spoken language understanding incorporating large language model, various changes may be made to FIG. 4. For example, while shown as a series of steps, various steps in FIG. 4 could overlap, occur in parallel, occur in a different order, or occur any number of times (including zero times). Although FIG. 5 illustrates one example of diagram 500 of an electronic device performing the method 400, various changes may be made to FIG. 5. For example, while shown as a series of steps, various steps in FIG. 5 could overlap, occur in parallel, occur in a different order, or occur any number of times (including zero times).

Figure 6:
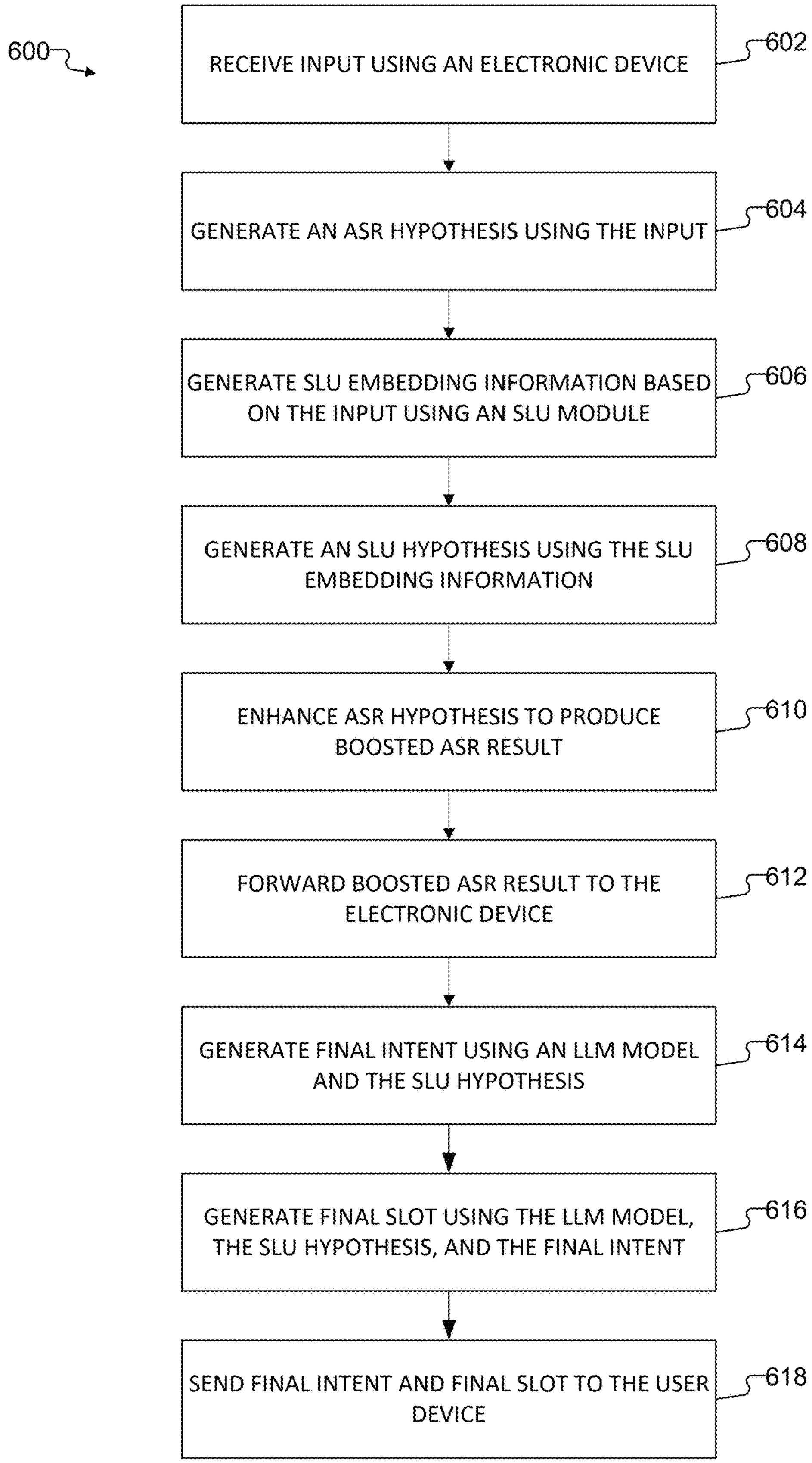
FIG. 6 illustrates an example method for automatic speech recognition and boosted spoken language understanding incorporating large language model according to an embodiment of the present disclosure.
Figure 7:
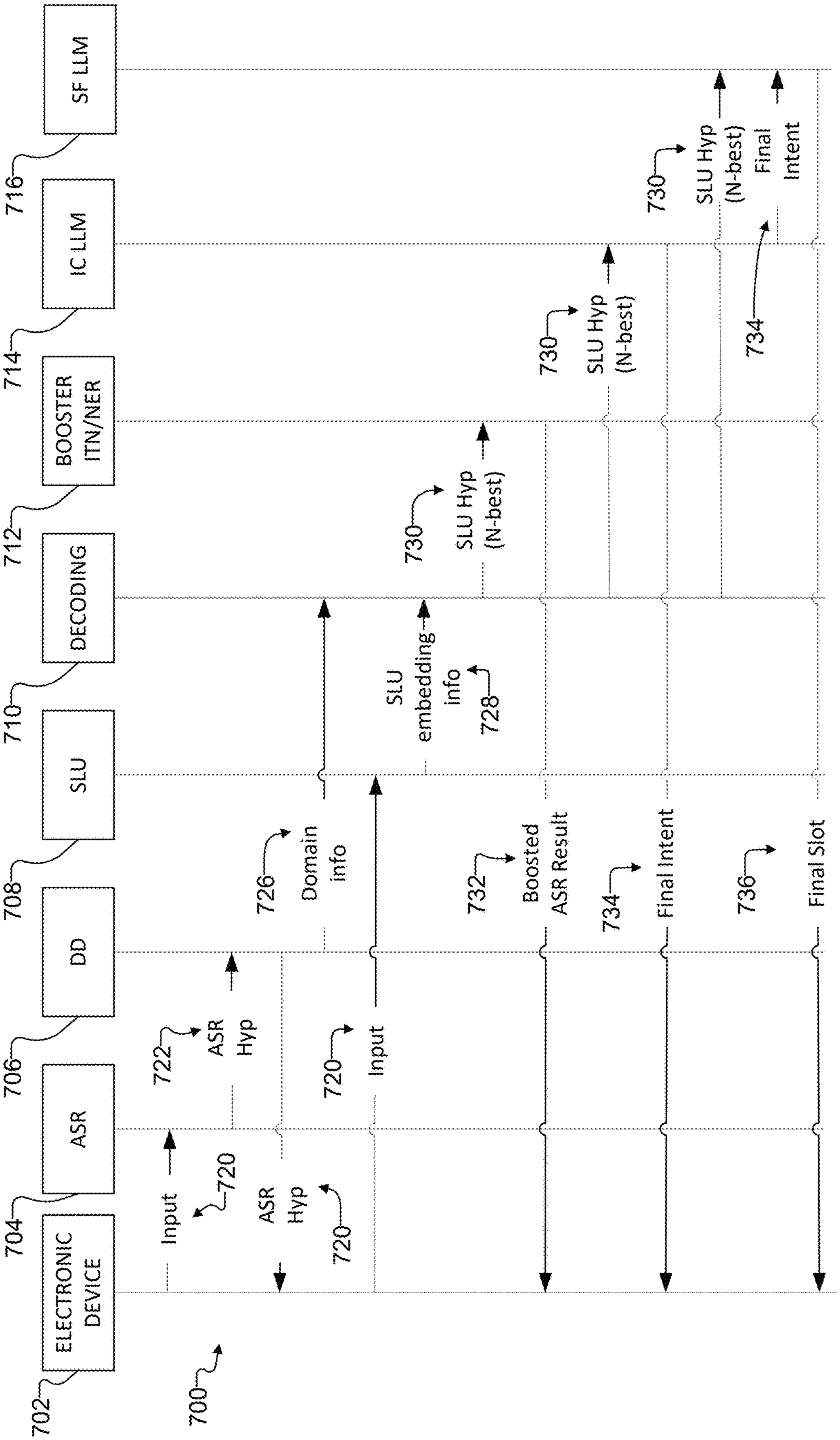
FIG. 7 illustrates an example diagram of an electronic device performing the method of FIG. 6 according to an embodiment of the present disclosure.

FIG. 6 illustrates an example method 600 for automatic speech recognition and boosted spoken language understanding incorporating large language model according to an embodiment of the present disclosure. For ease of explanation, the method 600 is described as involving the use of the electronic device 101 in the network configuration 100 of FIG. 1. However, the method 600 may be used with any other suitable electronic device (such as the server 106) or a combination of devices (such as the electronic device 101 and the server 106) and in any other suitable system(s). FIG. 7 illustrates an example diagram of an electronic device performing the method 600 of FIG. 6 according to an embodiment of the present disclosure. For example, the electronic device may be the electronic device 101 in the network configuration 100 of FIG. 1. However, the diagram 700 may be used with any other suitable electronic device (such as the server 106) or a combination of devices (such as the electronic device 101 and the server 106) and in any other suitable system(s).

As shown in FIG. 6, the method 600 incorporates a multi-step LLM to firstly predict a final intent based on an N-best hypothesis of the ASR, intents, and (optionally) slots from the SLU model and then predict final slots based on an N-best hypothesis of the ASR, a predicted intent from the LLM (intent classifier model), and (optionally) slots from the SLU model.

In operation 602, an input 720, e.g., audio provided by the user, is received, e.g., at an electronic device 702, and the input 720 is forwarded to an ASR model 704, which can be compact streaming ASR, separate from joint ASR-SLU model 202.

In operation 604, an ASR hypothesis 722 is generated by the ASR model 704 and returning it to the electronic device 702 for display to the user. The ASR hypothesis 722 is also provided to a domain detector model 706 to detect domain information 726, e.g., music, general, contact, from the ASR hypothesis 722.

The domain detector model 706 can be a classifier for music, general, and contact domain information 726 from the ASR hypothesis 722. The domain detector model 706 may include a rule-based or neural network text classification model where the domain information 726, e.g., music, general, and contact, and its corresponding probability may be used as additional input for the LLM model, e.g., music [0.8]/general [0.19]/contact [0.01]. By providing domain information 726 with n-best hypothesis, e.g., the SLU hypothesis 730, to an LLM model, e.g., the intent classifier LLM model 714 and a slot filler LLM model 716, the accuracy of the prediction of final intent and slots improves.

In operation 606, the input 720 may be sent to an SLU model 708, which can be part of the joint ASR-SLU model 202, to generate SLU embedding information 728 using accumulated input 720. For example, the SLU model 708 may be configured similarly to the SLU model process 300B of FIG. 3B to produce a probability distribution for intent and slot predictions based on the received input 720.

In operation 608, the SLU embedding information 728, e.g., as probability distributions, are inputted into a decoding algorithm 710. The decoding algorithm may include an LM fusion that may also incorporate the domain information 726 as an input. The decoding algorithm 710 then generates an SLU hypothesis 730 similar to the decoding algorithm 510 of FIG. 5.

In optional operation 610, the ASR result may be enhanced by an ASR boosting model 712, e.g., a model that includes an inverse text normalization model and a named entity recognition model, to produce a boosted ASR result 732, e.g., a 1-best result, similar to the ASR boosting model 512 of FIG. 5.

In operation 612, the boosted ASR result 732 may be forwarded back to the electronic device 702 and used for other purposes, such as displaying the boosted ASR result 732 or using the boosted ASR result 732 in other applications separate from ASR-based systems.

In operation 614, the SLU hypothesis 730 may be forwarded an intent classifier LLM model 714 that may use an N-best hypothesis model to improve the accuracy of the intent prediction to produce an updated intent prediction 734. The intent classifier LLM model 714 may use the SLU hypotheses, which may optionally be an N-best list of hypotheses, to generate a final intent prediction 734.

In operation 616, the SLU hypothesis 730 may be forwarded to a slot filler LLM model 716 that may use the updated intent prediction 734 and the SLU hypothesis 730 to improve the accuracy for slot prediction. The slot filler LLM model 716 may then generate, e.g., using an N-best hypothesis model, a final slot prediction 736.

In operation 618, the final intent prediction 734 and the final slot prediction 736 may then be forwarded from the slot filler LLM model 716 to the electronic device 702.

Although FIG. 6 illustrates one example of a method 600 for automatic speech recognition and boosted spoken language understanding incorporating large language model, various changes may be made to FIG. 6. For example, while shown as a series of steps, various steps in FIG. 6 could overlap, occur in parallel, occur in a different order, or occur any number of times (including zero times). Although FIG. 7 illustrates one example of diagram 700 of an electronic device performing the method 600, various changes may be made to FIG. 7. For example, while shown as a series of steps, various steps in FIG. 7 could overlap, occur in parallel, occur in a different order, or occur any number of times (including zero times).

Figure 8:
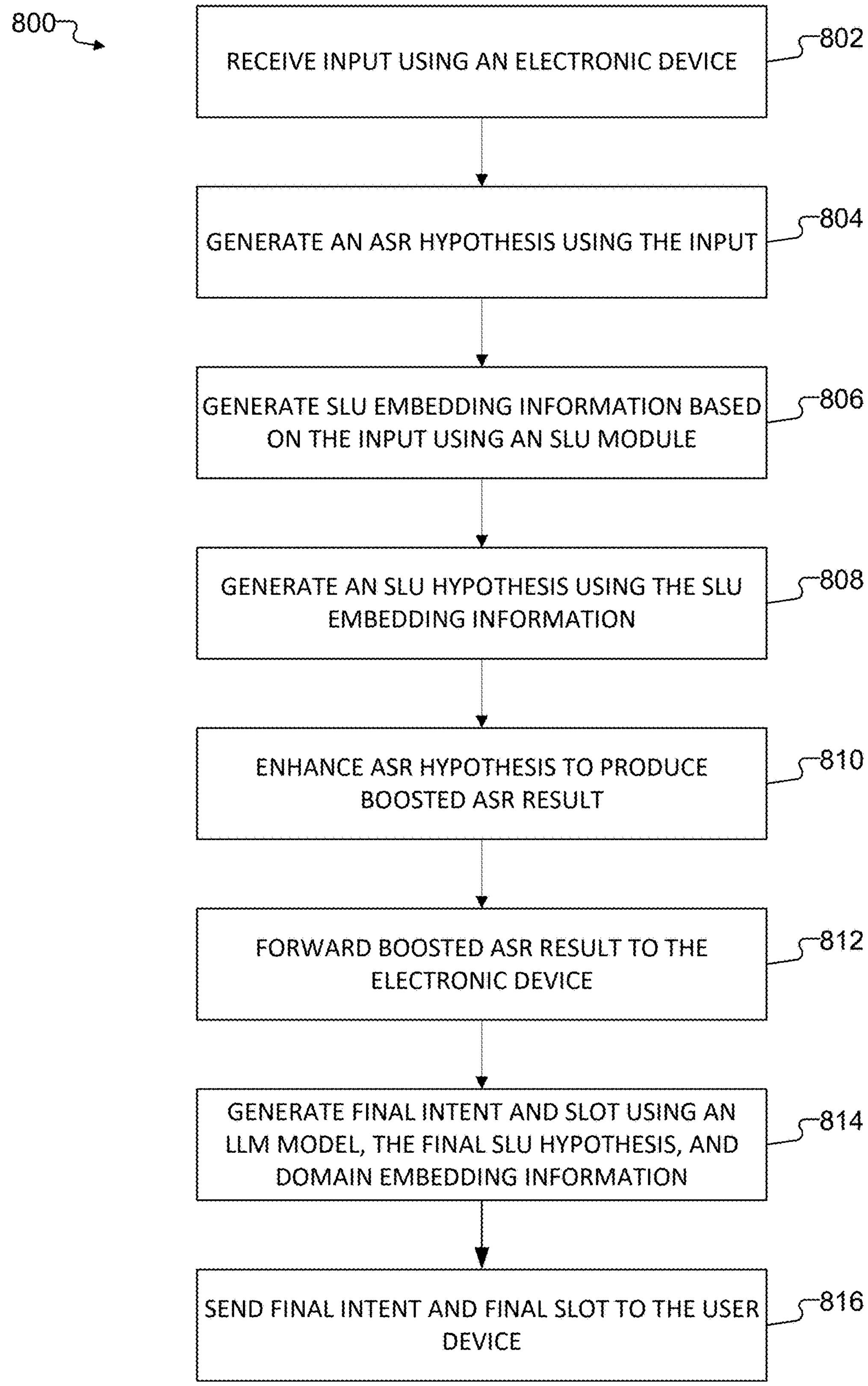
FIG. 8 illustrates an example method for automatic speech recognition and boosted spoken language understanding incorporating large language model according to an embodiment of the present disclosure.
Figure 9:
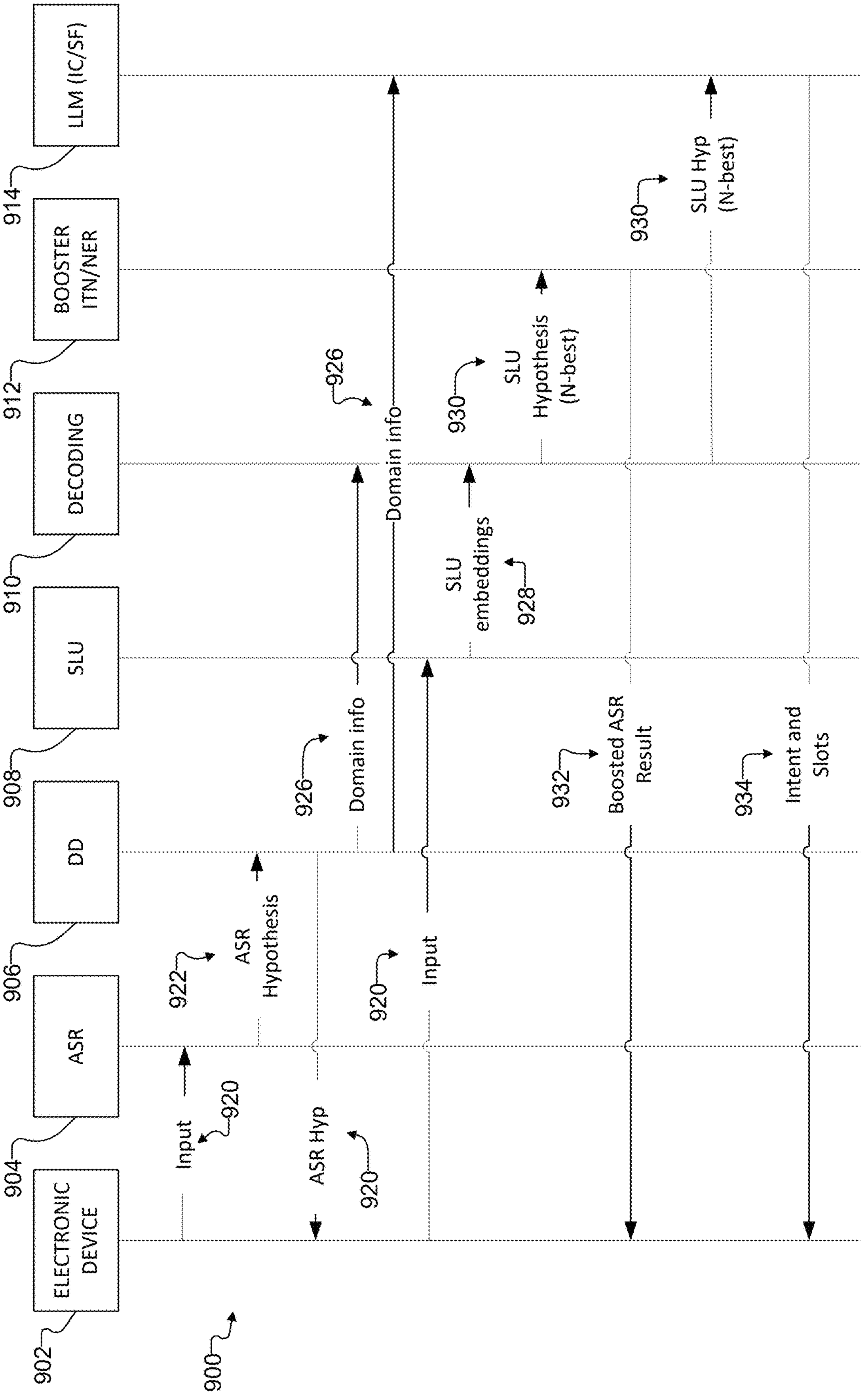
FIG. 9 illustrates an example diagram of an electronic device performing the method of FIG. 8 according to an embodiment of the present disclosure.

FIG. 8 illustrates an example method 800 for automatic speech recognition and boosted spoken language understanding incorporating large language model according to an embodiment of the present disclosure. For ease of explanation, the method 800 is described as involving the use of the electronic device 101 in the network configuration 100 of FIG. 1. However, the method 800 may be used with any other suitable electronic device (such as the server 106) or a combination of devices (such as the electronic device 101 and the server 106) and in any other suitable system(s). FIG. 9 illustrates an example diagram of an electronic device performing the method 800 according to an embodiment of the present disclosure. For example, the electronic device may be the electronic device 101 in the network configuration 100 of FIG. 1. However, the diagram 900 may be used with any other suitable electronic device (such as the server 106) or a combination of devices (such as the electronic device 101 and the server 106) and in any other suitable system(s).

As shown in FIG. 8, the method 800 incorporates a large language model (LLM) to predict final intent first based on an N-best hypothesis of an ASR transcription, intent, (optionally) slots from an SLU model with the output of a Domain Detector (Music/General/Contact/Others).

In operation 802, an input 920, e.g., audio provided by the user, is received, e.g., at an electronic device 902, and the input 920 is forwarded to an ASR model 904, which can be part of the joint ASR-SLU model 202.

In operation 804, an ASR hypothesis 922 is generated by the ASR model 904. The ASR hypothesis 922 may be returned to the electronic device 902 for display to the user. The ASR hypothesis 922 may also be sent to a domain detector model 906 configured to detect a domain (Music/General/Contact/Others) using a from the ASR hypothesis 922.

In operation 806, the input 920 may be set to an SLU model 908, which can be compact streaming ASR, separate from joint ASR-SLU model 202 to generate SLU embedding information 928 using accumulated input 920. For example, the SLU model 908 may be configured similarly to the SLU model 301 of FIG. 3B to produce a probability distribution for intent and slot predictions based on the received input 920.

In operation 808, the SLU embedding information 928, e.g., as probability distributions, are inputted into a decoding algorithm 910. The decoding algorithm may include an LM fusion that may also incorporate the domain information 926 as an input. The decoding algorithm 910 then generates an SLU hypothesis 930 similar to the decoding algorithm 510 of FIG. 5.

In optional operation 810, enhancing the ASR output through an ASR boosting model 912, e.g., a model that includes an inverse text normalization model and a named entity recognition model, to produce a boosted ASR result 932.

In operation 812, the boosted ASR result 732 may be forwarded back to the electronic device 902 and used for other purposes, such as the boosted ASR result 932 or using the boosted ASR result 932 in other applications separate from ASR-based systems.

In operation 814, an N-best based LLM model 914 may be used to process the SLU hypotheses (optionally N-best) to improve the predict intents and entities (slots). The LLM model 914 may be configured to model for intent classification model and named entity recognition similar to the LLM model 514 of FIG. 5. The LLM model 914 may use the final SLU hypothesis and domain information 926 to predict final intents and slots 934.

In operation 816, the final intent and slot from the LLM model 914 is sent to the electronic device 902 for display or use in other systems.

The present disclosure provides for a systems and methods that provide a voice assistant framework with a spoken language understanding (SLU) model that improve the ASR hypotheses by generating an N-best lattice and subsequently generating an N-best list of SLU hypotheses to be input into an LLM model. The LLM model itself may be trained using a low rank adaptation process to finetune the model for improved accuracy in intent and slot predictions for voice assistant systems.

Although FIG. 8 illustrates one example of a method 800 for automatic speech recognition and boosted spoken language understanding incorporating large language model, various changes may be made to FIG. 8. For example, while shown as a series of steps, various steps in FIG. 8 could overlap, occur in parallel, occur in a different order, or occur any number of times (including zero times). Although FIG. 9 illustrates one example of diagram 900 of an electronic device performing the method 800, various changes may be made to FIG. 9. For example, while shown as a series of steps, various steps in FIG. 9 could overlap, occur in parallel, occur in a different order, or occur any number of times (including zero times).

It should be noted that the functions shown in FIGS. 2 through 9 or described above can be implemented in an electronic device 101, 102, 104, server 106, or other device(s) in any suitable manner. For example, in some embodiments, at least some of the functions shown in FIGS. 2 through 9 or described above can be implemented or supported using one or more software applications or other software instructions that are executed by the processor 120 of the electronic device 101, 102, 104, server 106, or other device(s). In other embodiments, at least some of the functions shown in FIGS. 2 through 9 or described above can be implemented or supported using dedicated hardware components. In general, the functions shown in FIGS. 2 through 9 or described above can be performed using any suitable hardware or any suitable combination of hardware and software/firmware instructions. Also, the functions shown in FIGS. 2 through 9 or described above can be performed by a single device or by multiple devices. For instance, the server 106 might be used to train the joint ASR-SLU model 202 and/or the LLM 203, and the server 106 could deploy the trained joint ASR-SLU model 202 and/or the LLM 203 to one or more other devices (such as the electronic device 101) for use.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
- receiving an input;
- generating a first automatic speech recognition (ASR) hypothesis based on the input using an ASR model;
- generating domain information using a domain detector model using the ASR hypothesis;
- generating spoken language understanding (SLU) embedded information based on the input using an SLU model;
- generating an SLU hypothesis using the SLU embedded information in a decoding algorithm;
- generating a final intent and slot prediction using the SLU hypothesis in a large language model (LLM) model; and
- sending the final intent and slot prediction to an electronic device.

2. The method of claim 1, wherein generating the final intent and slot prediction using the SLU hypothesis in the LLM model comprises:
- generating a final intent prediction using an intent classifier LLM model; and
- generating a final slot prediction using a slot filler LLM model.

3. The method of claim 2, wherein generating the final slot prediction using the slot filler LLM model comprises using the final intent prediction as an input to the slot filler LLM model.

4. The method of claim 1, wherein generating the final intent and slot prediction using the SLU hypothesis in the LLM model further comprises using the domain information in the LLM model to generate the final intent and slot prediction.

5. The method of claim 1, wherein generating the SLU embedded information based on the input using the SLU model comprises generating a lattice comprising a plurality of SLU hypotheses.

6. The method of claim 5, wherein generating the SLU hypothesis using the SLU embedded information in the decoding algorithm comprises generating an N-best list of SLU hypotheses by selecting n-least cost paths in the lattice.

7. The method of claim 6, wherein generating the final intent and slot prediction using the SLU hypothesis in the LLM model comprises inputting the selected N-least cost paths into the LLM model.

8. An electronic device, comprising:

at least one processing device configured to:

receive an input;

generate a first automatic speech recognition (ASR) hypothesis based on the input using an ASR model;

generate domain information using a domain detector model using the ASR hypothesis;

generate spoken language understanding (SLU) embedded information based on the input using an SLU model;

generate an SLU hypothesis using the SLU embedded information in a decoding algorithm;

generate a final intent and slot prediction using the SLU hypothesis in a large language model (LLM) model; and send the final intent and slot prediction to another electronic device.

9. The electronic device of claim 8, wherein, to generate the final intent and slot prediction using the SLU hypothesis in the LLM model, the at least one processing device is further configured to:

generate a final intent prediction using an intent classifier LLM model; and generate a final slot prediction using a slot filler LLM model.

10. The electronic device of claim 9, wherein, to generate the final slot prediction using the slot filler LLM model, the at least one processing device is further configured to use the final intent prediction as an input to the slot filler LLM model.

11. The electronic device of claim 8, wherein, to generate the final intent and slot prediction using the SLU hypothesis in the LLM model, the at least one processing device is further configured to use the domain information in the LLM model to generate the final intent and slot prediction.

12. The electronic device of claim 8, wherein, to generate the SLU embedded information based on the input using the SLU model, the at least one processing device is further configured to generate a lattice comprising a plurality of SLU hypotheses.

13. The electronic device of claim 12, wherein, to generate the SLU hypothesis using the SLU embedded information in the decoding algorithm, the at least one processing device is further configured to generate an N-best list of SLU hypotheses by selecting n-least cost paths in the lattice.

14. The electronic device of claim 13, wherein, to generate the final intent and slot prediction using the SLU hypothesis in the LLM model, the at least one processing device is further configured to input the selected n-least cost paths into the LLM model.

15. A non-transitory computer-readable medium comprising instructions that, when executed by at least one processor of an electronic device, cause the electronic device to:

receive an input;

generate a first automatic speech recognition (ASR) hypothesis based on the input using an ASR model;

generate domain information using a domain detector model using the ASR hypothesis;

generate spoken language understanding (SLU) embedded information based on the input using an SLU model;

generate an SLU hypothesis using the SLU embedded information in a decoding algorithm;

generate a final intent and slot prediction using the SLU hypothesis in a large language model (LLM) model; and send the final intent and slot prediction to another electronic device.

16. The non-transitory computer-readable medium of claim 15, wherein the instructions that, when executed by the at least one processor, cause the electronic device to generate the final intent and slot prediction using the SLU hypothesis in the LLM model, further comprise instructions that, when executed by the at least one processor, cause the electronic device to generate a final intent prediction using an intent classifier LLM model and generating a final slot prediction using a slot filler LLM model.

17. The non-transitory computer-readable medium of claim 16, wherein the instructions that, when executed by the at least one processor, cause the electronic device to generate the final slot prediction using the slot filler LLM model, further comprise instructions that, when executed by the at least one processor, cause the electronic device to use the final intent prediction as an input to the slot filler LLM model.

18. The non-transitory computer-readable medium of claim 15, wherein the instructions that, when executed by the at least one processor, cause the electronic device to generate the final intent and slot prediction using the SLU hypothesis in the LLM model, further comprise instructions that, when executed by the at least one processor, cause the electronic device to use the domain information in the LLM model to generate the final intent and slot prediction.

19. The non-transitory computer-readable medium of claim 18, wherein the instructions that, when executed by the at least one processor, cause the electronic device to generate the SLU embedded information based on the input using the SLU model, further comprise instructions that, when executed by the at least one processor, cause the electronic device to generate a lattice comprising a plurality of SLU hypotheses.

20. The non-transitory computer-readable medium of claim 19, wherein the instructions that, when executed by the at least one processor, cause the electronic device to generate the SLU hypothesis using the SLU embedded information in the decoding algorithm, further comprise instructions that, when executed by the at least one processor, cause the electronic device to generate an N-best list of SLU hypotheses by selecting n-least cost paths in the lattice.

* * * * *